Dec. 20, 1960   H. KLEMANN ET AL   2,964,996
PROJECTION MICROSCOPES
Filed May 19, 1959   2 Sheets-Sheet 1

INVENTORS:
HEINRICH KLEMANN & RUDOLF KLEIN
BY
AGENT

Dec. 20, 1960  H. KLEMANN ET AL  2,964,996
PROJECTION MICROSCOPES
Filed May 19, 1959  2 Sheets-Sheet 2
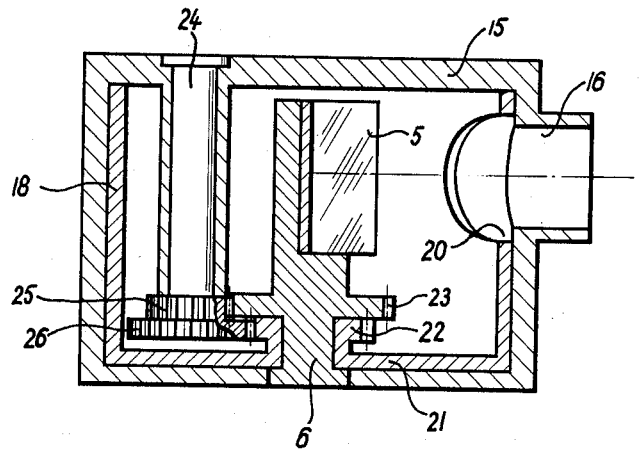
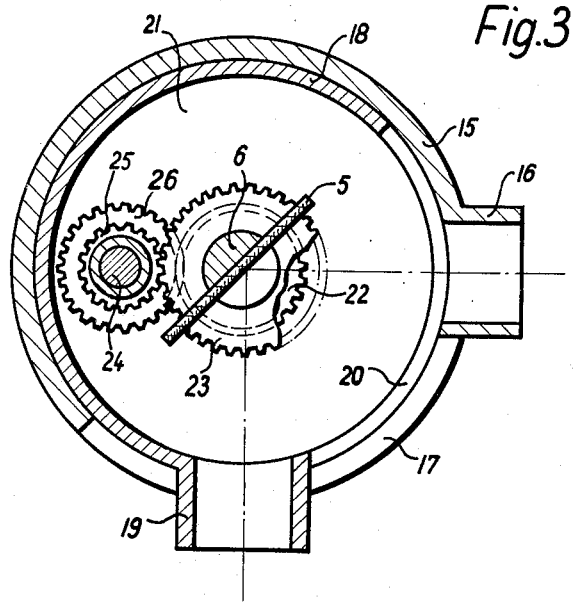
INVENTORS:
HEINRICH KLEMANN & RUDOLF KLEIN
BY
AGENT

United States Patent Office 2,964,996
Patented Dec. 20, 1960

2,964,996

PROJECTION MICROSCOPES

Heinrich Klemann, Burgsolms, Wetzlar, and Rudolf Klein, Wissmar uber Giessen, Germany, assignors to Ernst Leitz G.m.b.H., Wetzlar, Germany, a corporation of Germany Filed May 19, 1959, Ser. No. 814,255

3 Claims. (Cl. 88—40)

The present invention relates to means for projecting microscopic objects, and more particularly to microscopes with pivotal projection screens which permit adjustment to the most favorable observation conditions.

In known apparatus of this type, the pivotal axis of the screen coincides with the optical axis of that part of the beam which enters the first of the projecting elements, which moves with the screen. This has the disadvantage that the image tumbles on the screen by the pivotal movement of the movable part of the projection assembly and thus makes variable the orientation in relation to the image visible in the microscope eyepiece.

It is the principal object of this invention to overcome this disadvantage and to provide a projection microscope wherein the object visible on the projection screen has the same orientation as the object image in the microscope eyepiece and the projected image does not tumble when the adjustable projection means is pivoted.

The above and other objects are accomplished according to the present invention by providing a beam deflecting system comprising a plurality of beam reflecting means between a microscope tube and a projection screen, the projection screen and one of the beam reflecting means having a common pivotal axis which lies in the plane of the one beam reflecting means and is perpendicular to the incident beam.

In accordance with a preferred embodiment, the beam deflecting system includes a pivotal mirror which is so synchronized with the pivotal part of the system including the projection screen that it turns therewith but through only half (α/2) the angle of rotation (α) of said pivotal part and screen.

In the accompanying drawing,

Fig. 1 schematically illustrates a specific embodiment of an optical beam deflecting system constituting means for projecting microscopic objects according to the invention;

Fig. 2 is a vertical section showing the mechanical means for rotating the projection screen in relation to the beam deflecting means; and Fig. 3 is a transverse cross section of Fig. 2.

Figure 1:
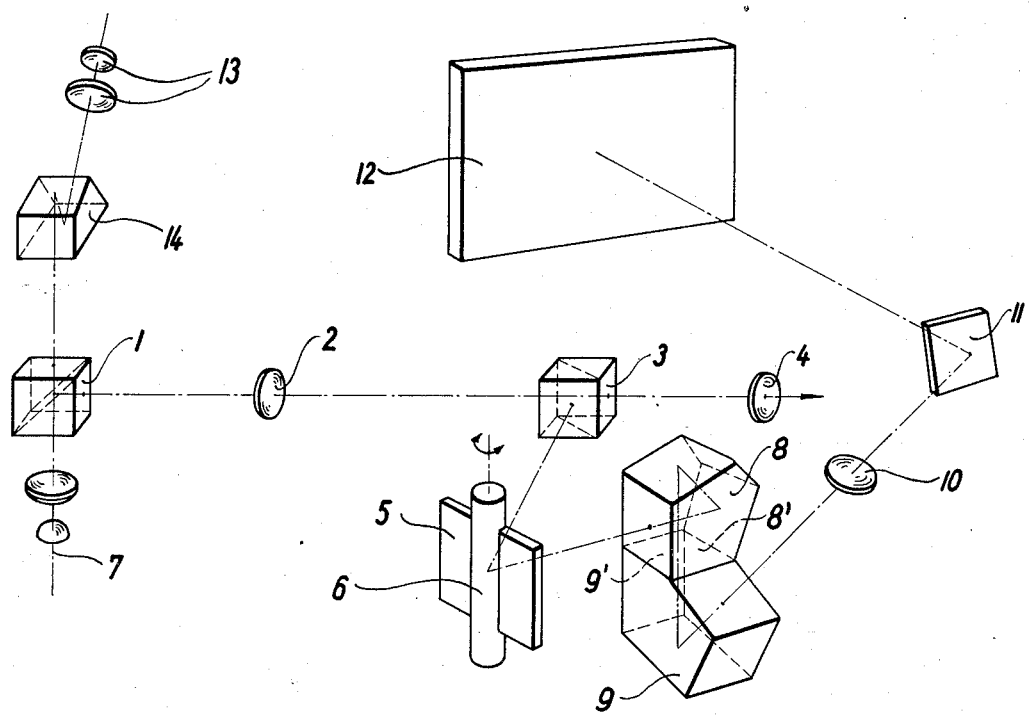
Fig. 1 illustrates the beam path as it emerges from the microscope tube and passes through the microscope eyepiece as well as through the projection attachment.

Referring now to the drawing, there is shown a first optical beam dividing means arranged in the optical axis 7 of a microscope tube, the illustrated beam dividing means being constituted by a prism 1 having a semi-transparent beam dividing surface. One part of the beam passes through the semi-transparent surface and is guided by deflecting prism 14 to eyepiece 13 where the microscopic object may be observed directly. The other part of the beam is reflected from the semi-transparent beam dividing surface of prism 1 to lens 2 which directs the reflected beam part to a second optical beam dividing means constituted in the illustrated embodiment by a prism 3 having a semi-transparent beam dividing surface. One part of the reflected beam passes through the latter surface to a camera lens 4 which enables the microscopic object to be photographed. The other part of the reflected beam part is again reflected from the semi-transparent dividing surface of prism 3 to pivotal mirror 5. The pivotal mirror axis 6 is in the plane of the mirror and, being parallel to the optical axis 7 of the microscope, it is perpendicular to the beam part reflected from beam divider 1, which constitutes the incident beam of the projection system.

As shown in the drawing, the beam passes from mirror 5 through penta prism 8 whose exit face 8' is cemented to entrance face 9' of a reflecting prism 9 whose exit face is inclined by 135°. The projecting eyepiece 10 throws the beam onto a deflecting mirror 11 whence it is projected onto a transparent projection screen 12.

The image on the projection screen has the same orientation as the object image in microscope eyepiece 13.

Prisms 8, 9, lens 10, deflecting mirror 11, and projection screen 12 are fixedly mounted in relation to each other and constitute a projection assembly which is, as a whole, pivotal about axis 6 of mirror 5.

The preferred gearing means for turning the pivotal mirror 5 by an angle of α/2, while projection screen 12 is rotated by angle α, is illustrated in Figs. 2 and 3, any equivalent mechanical means being useful for this purpose.

As shown, mirror 5 is fixedly mounted on shaft 6 which is journaled in the bottom of housing 15. The housing 15 has a beam entrance tube 16 pointing toward prism 3 and coaxial with the beam emerging from the latter prism. A tubular body 18 is rotatably mounted in cylindrical housing 15 and has a laterally extending exit tube 19 pointing toward penta prism 8. The cylindrical housing has a circumferential slot 17 serving as a guide for exit tube 19 when the body 18 is pivoted in its housing 15. The tubular body 18 itself has a circumferential slot 20 to permit the incident beam to enter into the housing through tube 16 and to be reflected by mirror 5 through exit tube 19.

The tubular body has a bottom plate 21 with a hub mounted on shaft 6 and carrying gear 22. The hub of bottom plate 21 and a central bore in gear 22 serve as bearing for shaft 6 which carries gear 23. An eccentrically arranged bearing in housing 15 mounts a shaft 24 which carries gears 25 and 26, gears 22 and 26 as well as gears 23 and 25 respectively meshing with each other. Gears 22 and 26 have the same diameter while the diameter ratio of gears 25 and 23 is 1:2 so that a pivotal movement of tubular body 18 about an angle α causes the shaft 6 and mirror 5 to move about an angle α/2.

In this manner the projection screen 12 receives full light in any possible pivotal position.

While the invention has been described and illustrated in connection with a specific embodiment, it will be understood that many variations and modifications in the specific optical deflecting and reflecting means may occur to the skilled in the art without departing from the spirit and scope of this invention as defined in the appended claims.

We claim:

1. A microscope attachment for projecting a microscopic object, comprising a pivotal projection screen, a first optical beam dividing means fixedly mounted in the optical axis of the microscope, and a beam deflecting system including a plurality of optical beam reflecting means mounted between said optical beam dividing means and said projection screen, said system including a first optical beam reflecting means arranged to receive an incident beam from said optical beam dividing means, a pivotal mirror means arranged to receive a beam reflected from said first optical beam reflecting means, the projection screen and the mirror means being pivotal about a common axis, said axis lying in the plane of the mirror means and being perpendicular to said incident beam, and a beam direction change prism assembly mounted in fixed relation to the projection screen between the mirror means and the screen, said assembly being pivotal with the screen about said common axis.

2. The microscope attachment of claim 1, comprising mechanical means for reducing the rotational angle of the pivotal mirror means to half the rotational angle of the projection screen.

3. The microscope attachment of claim 1, wherein said assembly consists of a penta prism and a 135° reflecting prism whose main sectional plane is rotated by 90° in relation to the main sectional plane of the penta prism.

References Cited in the file of this patent

UNITED STATES PATENTS

| | | |
|---|---|---|
| 2,651,969 | Thor | Sept. 15, 1953 |
| 2,857,523 | Corso | Oct. 21, 1958 |

OTHER REFERENCES

"Improved Ultraviolet Microbeam Apparatus," Uretz et al., The Review of Scientific Instruments, Vol. 28, No. 11, Nov. 1957, pages 861–866. Page 864 relied upon.